United States Patent
Cleveland et al.

(10) Patent No.: US 11,794,587 B2
(45) Date of Patent: Oct. 24, 2023

(54) AUXILIARY POWER CONTROLLER

(71) Applicant: BNSF Railway Company, Fort Worth, TX (US)

(72) Inventors: Michael Cleveland, Fort Worth, TX (US); James Taylor, Shady Shores, TX (US)

(73) Assignee: BNSF Railway Company, Fort Worth, TX (US)

( * ) Notice: Subject to any disclaimer, the term of this patent is extended or adjusted under 35 U.S.C. 154(b) by 503 days.

(21) Appl. No.: 16/704,852

(22) Filed: Dec. 5, 2019

(65) Prior Publication Data

US 2021/0170874 A1 Jun. 10, 2021

(51) Int. Cl.
| | |
|---|---|
| B60L 3/12 | (2006.01) |
| B60L 58/13 | (2019.01) |
| B60L 1/00 | (2006.01) |
| B61C 3/02 | (2006.01) |
| B61C 17/06 | (2006.01) |

(52) U.S. Cl.
CPC ............... *B60L 3/12* (2013.01); *B60L 1/003* (2013.01); *B60L 58/13* (2019.02); *B61C 3/02* (2013.01); *B61C 17/06* (2013.01); *B60L 2200/26* (2013.01)

(58) Field of Classification Search
None
See application file for complete search history.

(56) References Cited

U.S. PATENT DOCUMENTS

| | | | | |
|---|---|---|---|---|
| 7,667,347 | B2 * | 2/2010 | Donnelly | B60L 1/02 307/85 |
| 9,715,261 | B2 * | 7/2017 | Wilkins | H02J 3/14 |
| 2008/0246338 | A1 | 10/2008 | Donnelly et al. | |
| 2012/0272857 | A1 | 11/2012 | Graab et al. | |
| 2012/0319469 | A1 * | 12/2012 | Krenz | H02J 3/007 307/9.1 |
| 2014/0035356 | A1 * | 2/2014 | Watarai | B60L 7/12 307/9.1 |
| 2019/0280483 | A1 * | 9/2019 | Ramamurthy | H02J 3/06 |

FOREIGN PATENT DOCUMENTS

JP 2009232520 A 10/2009

OTHER PUBLICATIONS

Patent Cooperation Treaty, International Search Report and Written Opinion, International Application No. PCT/US2020/055999, dated Jan. 25, 2021, 9 pages.

* cited by examiner

*Primary Examiner* — Jared Fureman
*Assistant Examiner* — Joel Barnett
(74) *Attorney, Agent, or Firm* — WHITAKER CHALK SWINDLE & SCHWARTZ PLLC; Enrique Sanchez, Jr.

(57) ABSTRACT

In one embodiment, a method includes determining, by an auxiliary power controller, a first selection of one or more power input sources from a plurality of power input sources. The method also includes determining, by the auxiliary power controller, a first selection of one or more power consuming devices from a plurality of power consuming devices. The method further includes managing, by the auxiliary power controller, transfer of auxiliary power from the first selection of the one or more power input sources to the first selection of the one or more power consuming devices.

20 Claims, 6 Drawing Sheets

AUXILIARY POWER CONTROLLER

TECHNICAL FIELD

This disclosure generally relates to a controller, and more specifically to an auxiliary power controller.

BACKGROUND

The temperature of water and oil used for locomotive engines should be maintained within a certain temperature range to prevent damage to the engine. While idling may be used to maintain the oil and water temperatures, idling consumes fuel, which increases cost and emissions. Conventional auxiliary power units (APU) may be used to charge the starting battery and maintain the oil and water temperatures. However, APUs also consume fuel and produce emissions. Furthermore, adding an APU to the locomotive introduces another engine that the locomotive needs to maintain.

SUMMARY

According to an embodiment, an auxiliary power controller includes one or more processors and one or more computer-readable non-transitory storage media coupled to the one or more processors. The one or more computer-readable non-transitory storage media include instructions that, when executed by the one or more processors, cause the auxiliary power controller to perform operations including determining a first selection of one or more power input sources from a plurality of power input sources. The operations also include determining a first selection of one or more power consuming devices from a plurality of power consuming devices. The operations further include managing transfer of auxiliary power from the first selection of the one or more power input sources to the first selection of the one or more power consuming devices.

In certain embodiments, the operations further include determining a second selection of one or more power input sources from the plurality of power input sources such that the second selection of the one or more power input sources is different than the first selection of the one or more power input sources, determining a second selection of one or more power consuming devices from the plurality of power consuming devices such that the second selection of the one or more power consuming devices is different than the first selection the one or more of power consuming devices, and managing transfer of auxiliary power from the second selection of the one or more power input sources to the second selection of the one or more power consuming devices.

In certain embodiments, managing the transfer of auxiliary power from the one or more power input sources to the one or more power consuming devices includes determining a power demand of a first power consuming device of the first selection of power consuming devices, determining that a power supply of a first power input source of the first selection of the one or more power input sources exceeds the power demand, and initiating the transfer of the auxiliary power from the first power input source to the first power consuming device.

In certain embodiments, managing the transfer of auxiliary power from the one or more power input sources to the one or more power consuming devices includes determining a power demand of a first power consuming device of the first selection of power consuming devices, determining that a power supply of a first power input source of the first selection of the one or more power input sources is less than the power demand, determining that a power supply of the first power input source and a second power input source of the first selection of the one or more power input sources exceeds the power demand, and initiating the transfer of the auxiliary power from the first power input source and the second power input source to the first power consuming device.

The plurality of power input sources may include two or more of the following: an APU battery, a starter battery, a combination APU/starter battery, a solar panel, and a wayside power unit. The plurality of power consuming devices may include two or more of the following: a water pump, a water heater, an oil pump, an oil heater, a starter battery, a cab heater/air conditioner, an air compressor, and electrical components. The auxiliary power controller may be located within a vehicle such as a locomotive.

According to another embodiment, a method includes determining, by an auxiliary power controller, a first selection of one or more power input sources from a plurality of power input sources. The method also includes determining, by the auxiliary power controller, a first selection of one or more power consuming devices from a plurality of power consuming devices. The method further includes managing, by the auxiliary power controller, transfer of auxiliary power from the first selection of the one or more power input sources to the first selection of the one or more power consuming devices.

According to yet another embodiment, one or more computer-readable non-transitory storage media embody instructions that, when executed by a processor, cause the processor to perform operations including determining a first selection of one or more power input sources from a plurality of power input sources. The operations also include determining a first selection of one or more power consuming devices from a plurality of power consuming devices. The operations further include managing transfer of auxiliary power from the first selection of the one or more power input sources to the first selection of the one or more power consuming devices.

Technical advantages of certain embodiments of this disclosure may include one or more of the following. The auxiliary power controller is modular in design, which allows for flexibility in the selection of the one or more power input sources and the selection of the one or more power consuming devices. The modular design of the APU systems described herein allows for future upgrades (e.g., the addition of solar panels as a power input source). The modular design of the APU systems described herein allows the auxiliary power controller to continue providing auxiliary power even if one of the power input sources fails. The auxiliary power controller manages energy flow between power input sources and power consuming devices, which may lower energy costs and reduce harmful emissions. If an APU engine is not selected or available as a power input source, the APU system is simple, easy to maintain, and has a low probability of failures.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

The systems and methods described herein allow for the use of multiple energy sources for the supply of auxiliary loads on vehicles such as locomotives. An auxiliary power controller is used to manage the flow of energy between multiple supplies and demands on the vehicle. Energy sources may include dedicated on-board batteries, starter batteries, a dynamic brake recapture system, wayside power units, solar panels, a main vehicle alternator, a separate diesel-powered auxiliary engine, and the like. Energy needs satisfied by these energy sources may include charging starting batteries, heating engine oil, heating engine water, heating the cab of the vehicle, cooling the cab of the vehicle, powering the cab electronics, and the like. This disclosure allows for a modular system to dynamically manage auxiliary loads and supplies on the vehicle. In contrast to conventional APU systems that only have a single diesel engine source for power, the systems and methods described herein allow for multiple sources of power for auxiliary loads based on the available/desired sources.

Figure 1:
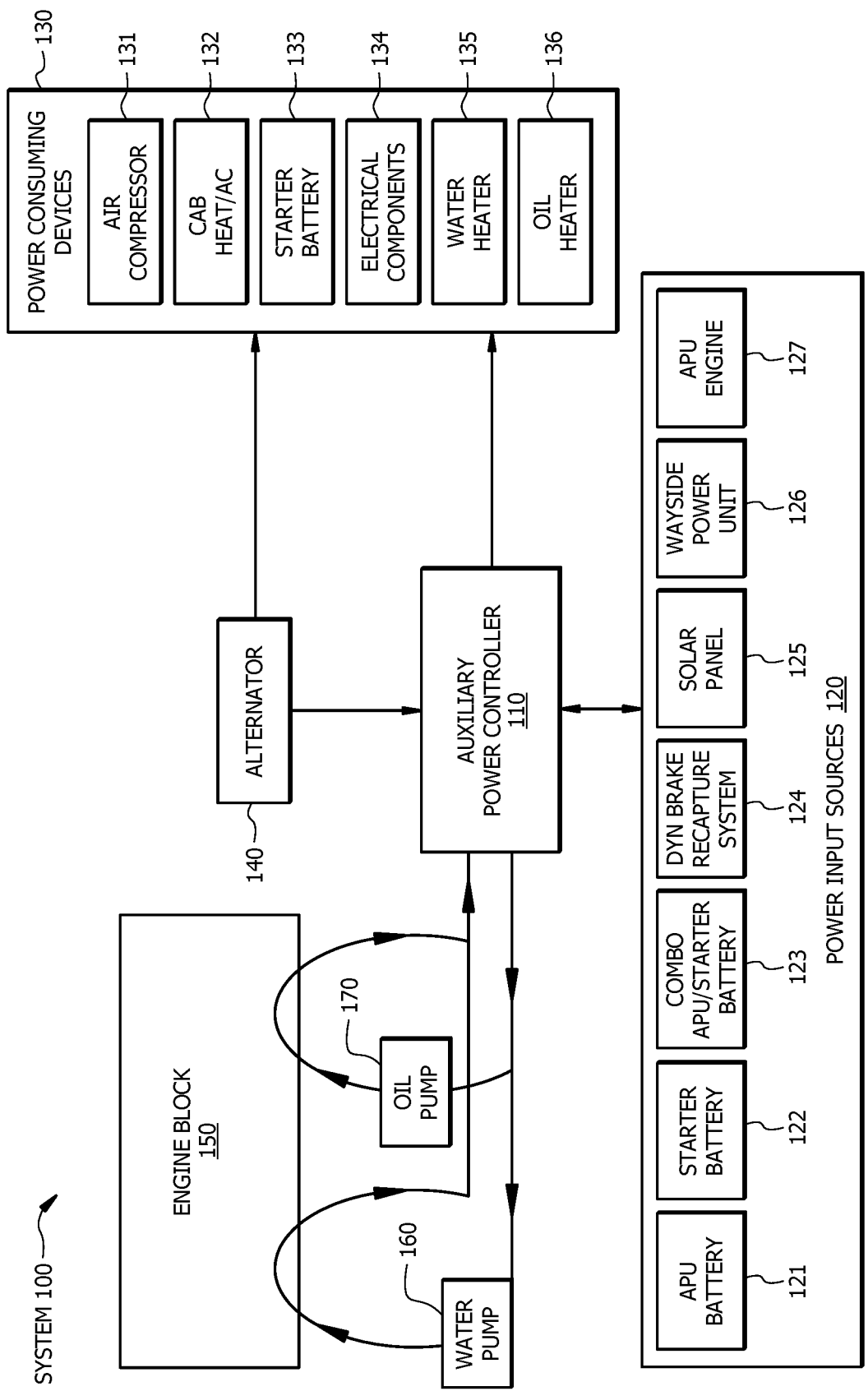
FIG. 1 illustrates an example system for managing the transfer of auxiliary power from one or more power input sources to the one or more power consuming devices using an auxiliary power controller.
Figure 2:
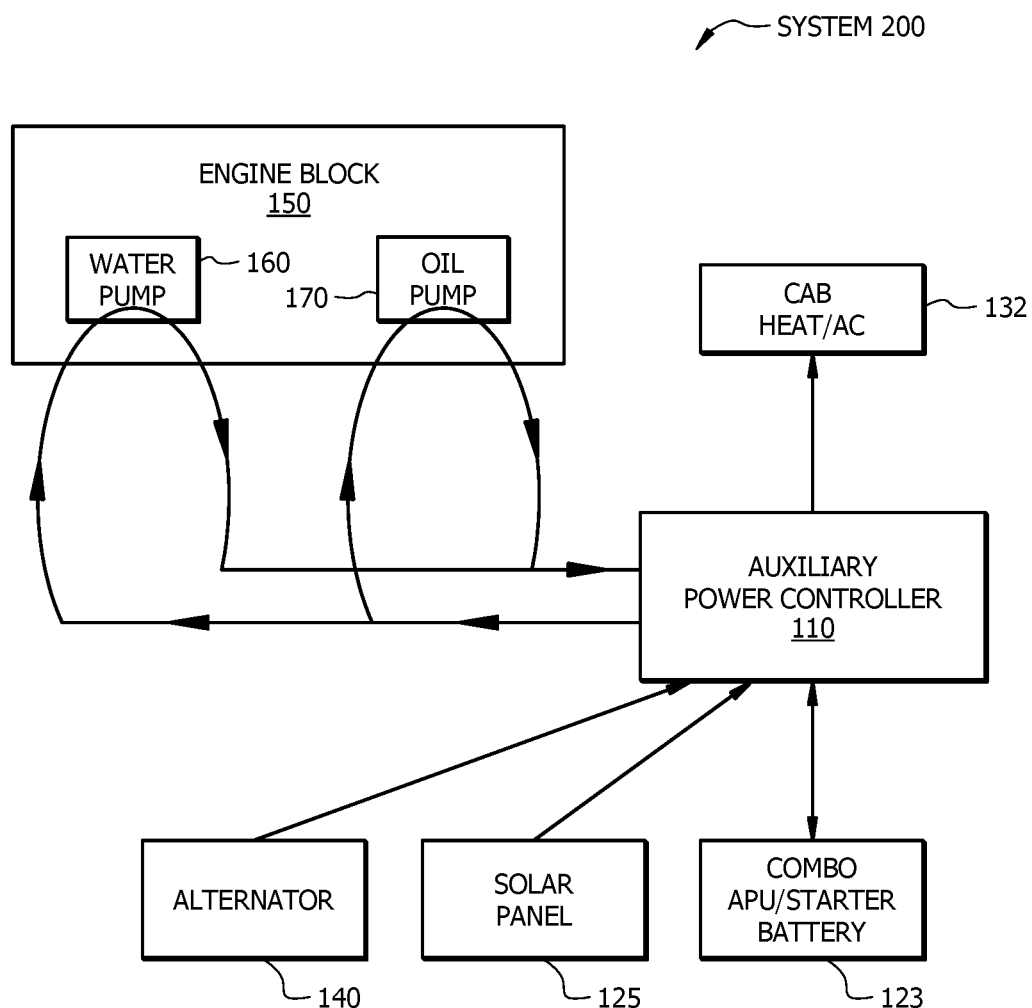
FIG. 2 illustrates an example system for managing the transfer of auxiliary power from a combination APU/starter battery and a solar panel to one or more power consuming devices using an auxiliary power controller.
Figure 3:
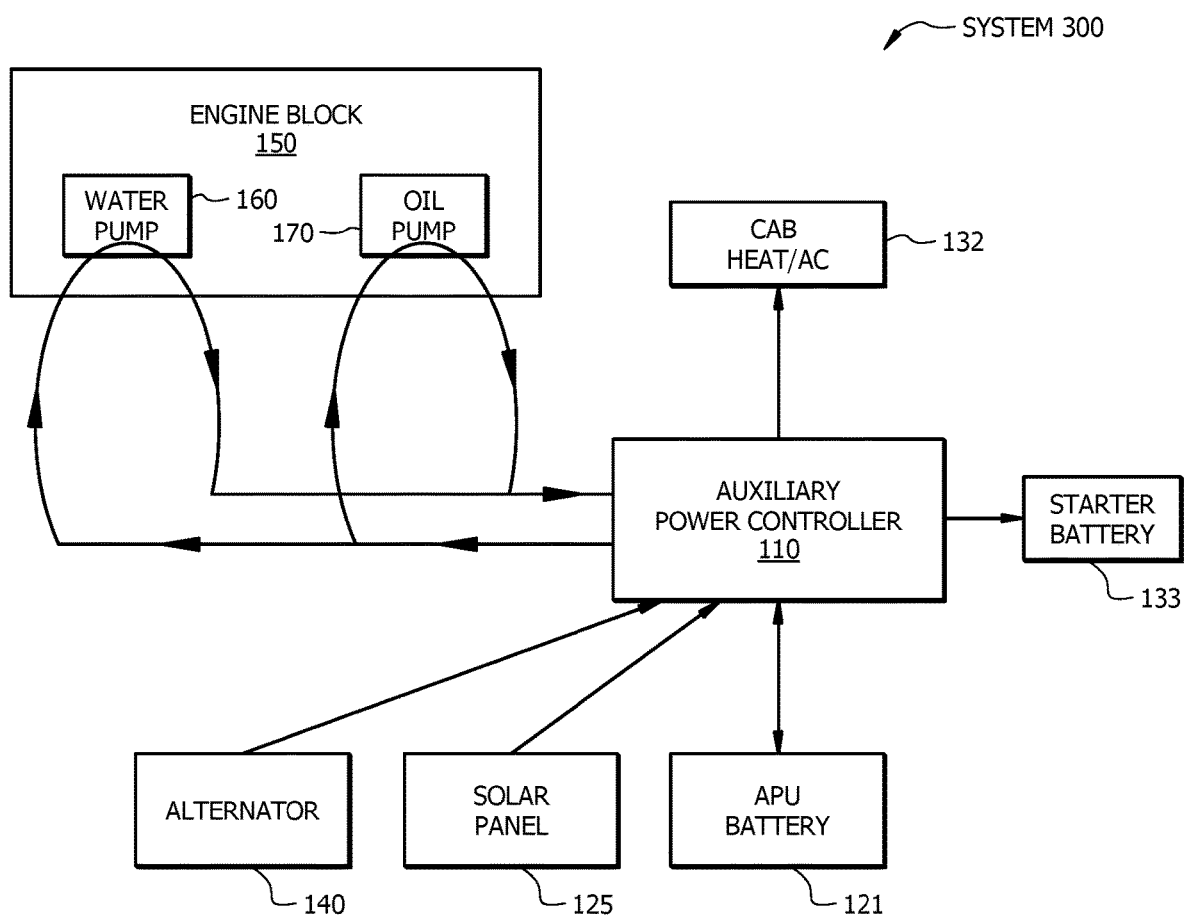
FIG. 3 illustrates an example system for managing the transfer of auxiliary power from an APU battery and a solar panel to one or more power consuming devices using an auxiliary power controller.
Figure 4:
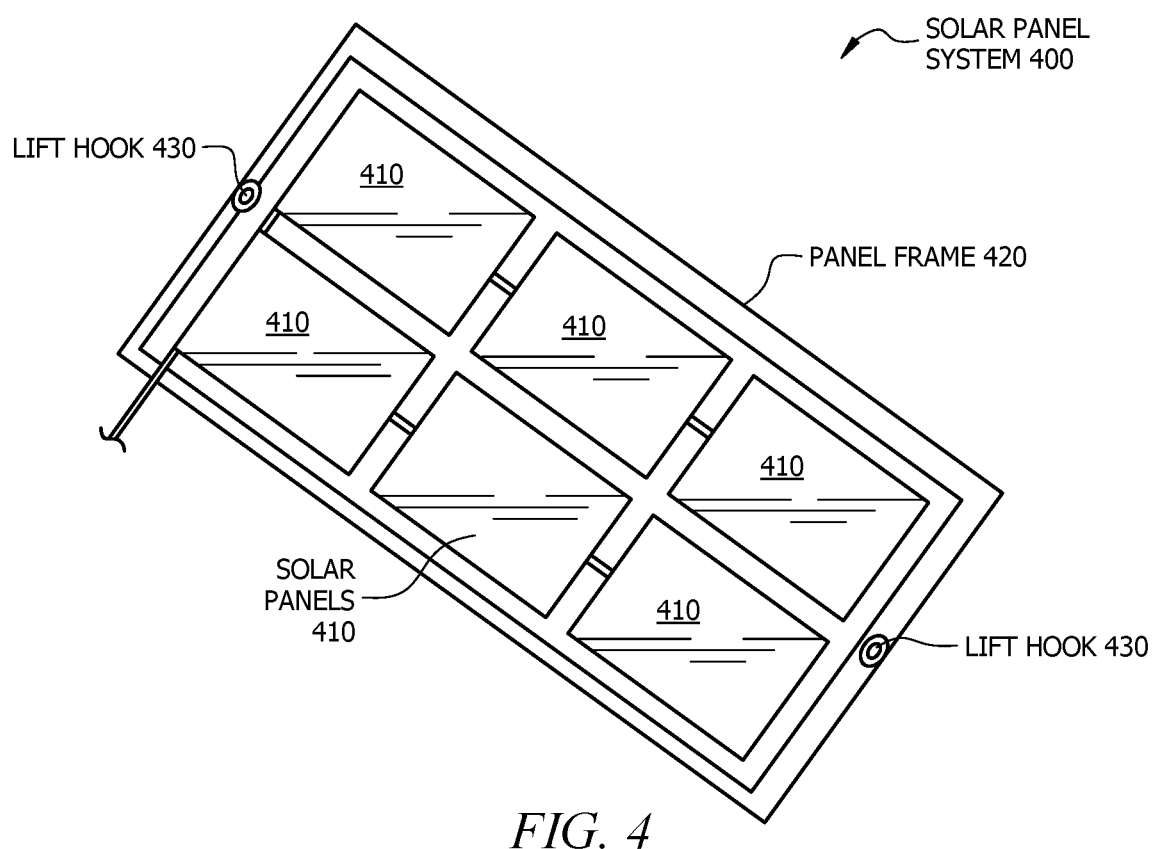
FIG. 4 illustrates an example solar panel system that may be used by the systems of FIGS. 1 through 3.
Figure 5:
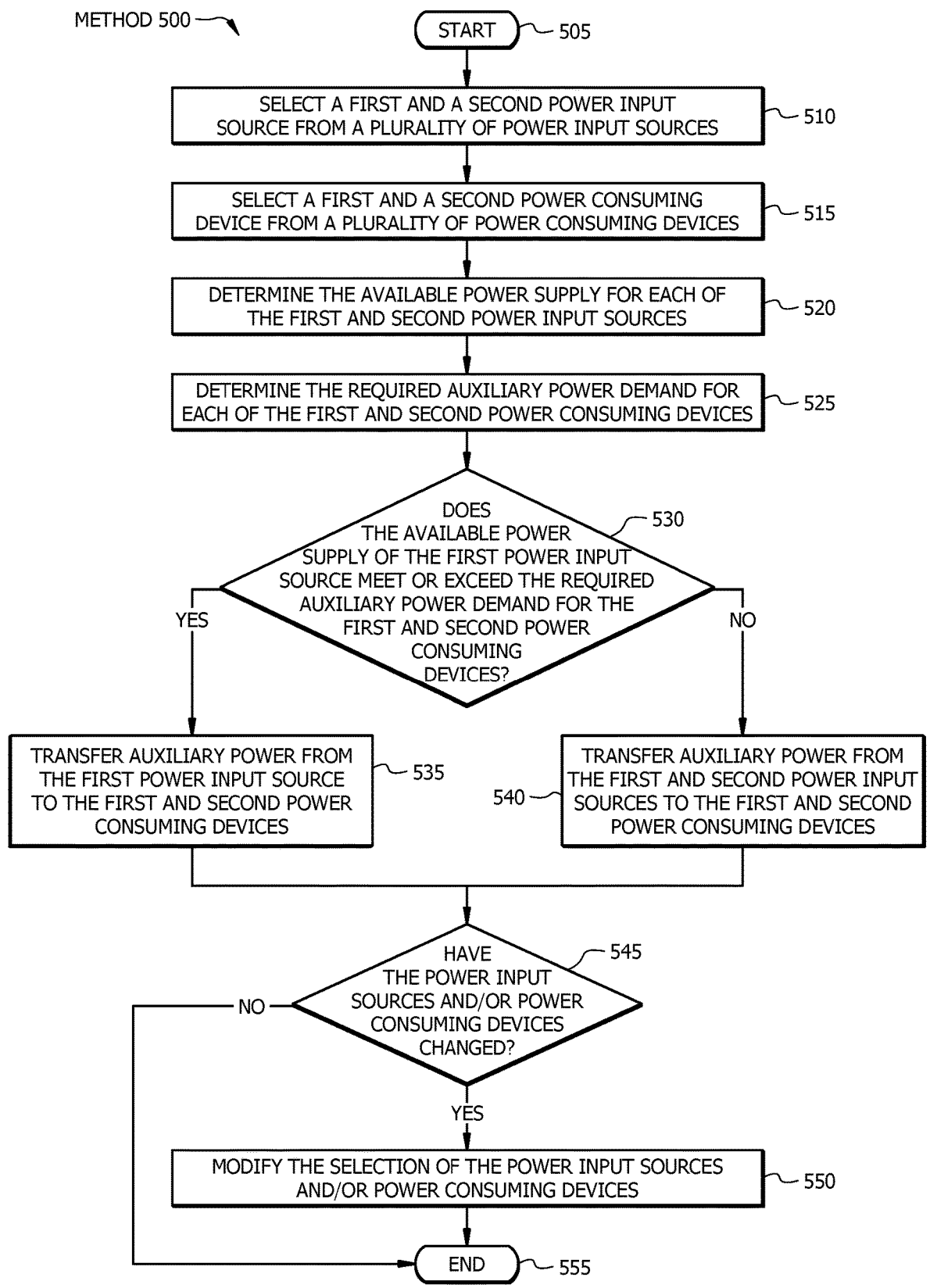
FIG. 5 illustrates an example method for managing the transfer of auxiliary power from one or more power input sources to the one or more power consuming devices using an auxiliary power controller.
Figure 6:
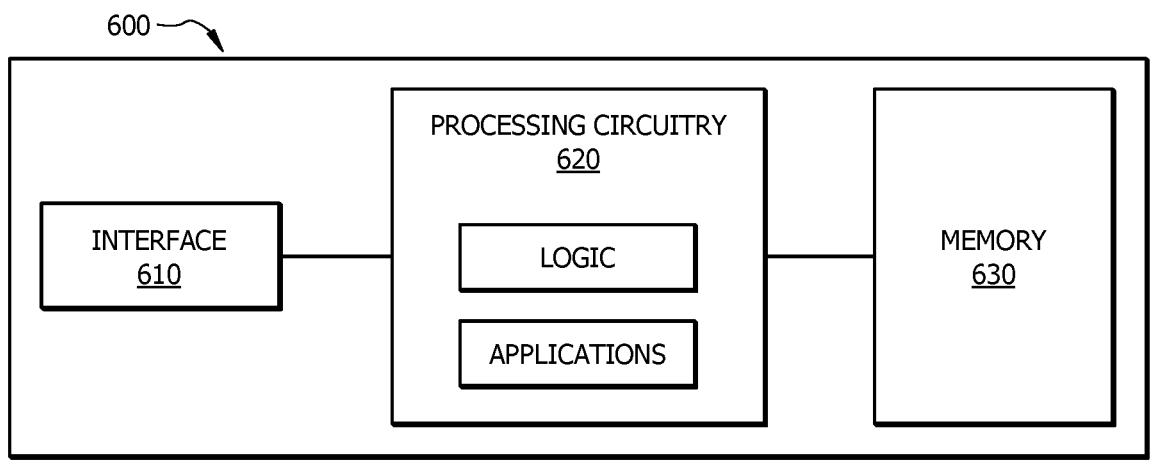
FIG. 6 illustrates an example computer system that may be used by the systems and methods described herein.

FIG. 1 shows an example system for managing the transfer of auxiliary power from one or more power input sources to the one or more power consuming devices using an auxiliary power controller. FIG. 2 shows an example system for managing the transfer of auxiliary power from a combination APU/starter battery and a solar panel to one or more power consuming devices using an auxiliary power controller. FIG. 3 shows an example system for managing the transfer of auxiliary power from an APU battery and a solar panel to one or more power consuming devices using an auxiliary power controller. FIG. 4 shows an example solar panel system that may be used by the systems of FIGS. 1 through 3. FIG. 5 shows an example method for managing the transfer of auxiliary power from one or more power input sources to the one or more power consuming devices using an auxiliary power controller. FIG. 6 shows an example computer system that may be used by the systems and methods described herein.

FIG. 1 illustrates an example system 100 for managing the transfer of auxiliary power from one or more power input sources 120 to the one or more power consuming devices 130 using an auxiliary power controller 110. System 100 or portions thereof may be associated with an entity, which may include any entity, such as a business or a company (e.g., a railway company, a transportation company, a shipping company, etc.). System 100 or portions thereof may be associated with a vehicle (e.g., a locomotive, an aircraft, a naval ship, a heavy-duty commercial vehicle, a military vehicle, a heavy-duty truck, etc.). The elements of system 100 may be implemented using any suitable combination of hardware, firmware, and software. For example, the elements of system 100 may be implemented using one or more components of the computer system of FIG. 6. System 100 of FIG. 1 includes auxiliary power controller 110, power input sources 120, power consuming devices 130, a locomotive alternator 140, an engine block 150, a water pump 160, and an oil pump 170.

Auxiliary power controller 110 is a component that manages the transfer of auxiliary power from one or more power input sources 120 to the one or more power consuming devices 130. Auxiliary power controller 110 represents any suitable computing component that may be used to process information for system 100. Auxiliary power controller 110 may coordinate the transfer of energy between one or more components of system 100 and/or facilitate communication between one or more components of system 100.

Auxiliary power controller 110 may communicate with one or more components of system 100 via a hard wire or a wireless connection. Auxiliary power controller 110 may include a communications function that allows users (e.g., a technician, an administrator, an operator, etc.) to communicate with one or more components of system 100 directly. For example, auxiliary power controller 110 may be part of a computer (e.g., a laptop computer, a desktop computer, a smartphone, a tablet, etc.), and a user (e.g., a vehicle operator) may access auxiliary power controller 110 through an interface (e.g., a screen, a graphical user interface (GUI), or a panel) of the computer. Auxiliary power controller 110 may communicate with one or more components of system 100 via a network. Auxiliary power controller 110 may be located in any suitable location to process information for system 100. For example, auxiliary power controller 110 may be located within a vehicle (e.g., a locomotive).

Auxiliary power controller 110 may determine a selection of one or more power input sources 120 from the plurality of power input sources 120. For example, auxiliary power controller 110 may determine that an operator has selected certain power input sources 120 from a predetermined selection of power input sources 120. As another example, auxiliary power controller 110 may detect (e.g., sense) available power input sources 120 from the predetermined selection of power input sources 120. As still another example, auxiliary power controller 110 may select power input sources 120 from the predetermined selection of power input sources 120 based on one or more factors (e.g., a geographical location of where the vehicle associated with auxiliary power controller 110 will be used, a size of the vehicle, an amount of auxiliary power required by the vehicle, and the like).

Auxiliary power controller 110 may determine a selection of one or more power consuming devices 130 from the plurality of power consuming devices 130. For example, auxiliary power controller 110 may determine that an operator has selected certain power consuming devices 130 from a predetermined selection of power consuming devices 130. As another example, auxiliary power controller 110 may automatically detect (e.g., sense) power consuming devices 130 from the predetermined selection of power consuming devices 130.

Auxiliary power controller 110 may manage the transfer of auxiliary power from one or more power input sources 120 to one or more power consuming devices 130. For example, auxiliary power controller 110 may determine a power supply of first power input source 120 and a power demand of first power consuming device 130. Auxiliary power controller 110 may then determine that the power supply of first power input source 120 meets or exceeds the power demand of first power consuming device 130 and, in response to this determination, initiate a transfer of auxiliary power from first power input source 120 to first power consuming device 130. As another example, auxiliary power controller 110 may determine that a power supply of first power input source 120 is less than the power demand of first power consuming device 130. Auxiliary power controller 110 may determine that a power supply of first power input source 120 is less than the power demand of first power consuming device 130. Auxiliary power controller 110 may determine that a combined power supply of two or more power input sources 120 exceeds the power demand of first power consuming device 130. In response to this determination, auxiliary power controller 110 may initiate a transfer of auxiliary power from the two or more power input sources 120 to first power consuming device 130.

Auxiliary power controller 110 may determine that the selection of power input sources 120 and/or the available power input sources 120 has changed. For example, auxiliary power controller 110 may determine that an operator has selected a different set of power input sources 120 from the predetermined selection of power input sources 120. In certain embodiments, the operator may add one or more power input sources 120 to the selection of power input sources 120, remove one or more power input sources 120 from the selection of power input sources 120, or replace one or more power input sources 120 within the selection of power input sources 120. In certain embodiments, auxiliary power controller 110 may automatically detect that one or more power input sources 120 has become available or unavailable and automatically change the selection of power input sources 120 based on availability.

Auxiliary power controller 110 may determine that the selection of power consuming devices 130 and/or available power consuming devices 130 has changed. In certain embodiments, auxiliary power controller 110 may determine that an operator has selected a different set of power consuming devices 130 from the predetermined selection of power consuming devices 130. For example, the operator may add one or more power consuming devices 130 to the selection of power consuming devices 130, remove one or more power consuming devices 130 from the selection of power consuming devices 130, or replace one or more power consuming devices 130 within the selection of power consuming devices 130. In certain embodiments, auxiliary power controller 110 may automatically detect that one or more power consuming devices has become available or unavailable and automatically change the selection of power consuming devices 130 based on availability.

Power input sources 120 of system 100 represent any physical components that can provide auxiliary power to one or more power consuming devices 130 of system 100. Power input sources 120 may be located in any suitable location for providing auxiliary power to one or more power consuming devices 130 of system 100. For example, power input sources 120 may be located on a vehicle, within the vehicle, or adjacent to the vehicle. Power input sources 120 may include an APU battery 121, a starter battery 122, a combination APU/starter battery 123, a dynamic brake recapture system 124, a solar panel 125, a wayside power unit 126, and an APU engine 127.

APU battery 121 of power input sources 120 is a dedicated on-board battery that provides power to auxiliary loads of a vehicle during engine shutdown. APU battery 121 may be charged through alternator 140 when the engine is running. APU battery 121 may be a lead acid battery, a lithium ion battery, a nickel manganese cobalt battery, an iron phosphate battery, or any other suitable battery that can store energy. Starter battery 122 of power input sources 120 provides the power required to start the engine of the vehicle. Starter battery 122 may also be used to run the electronics in the vehicle. Combination APU/starter battery 123 of power input sources 120 combines APU battery 121 and starter battery 122 into a single battery.

Dynamic brake recapture system 124 of power input sources 120 is a system that converts and stores a portion of the energy that is lost as heat from normal braking of the vehicle. Solar panel 125 of power input sources 120 is a component that absorbs the sun's rays as a source of energy. Solar panel 125 is described in more detail in FIG. 4 below. Wayside power unit 126 of power input sources 120 provides standard utility power to a vehicle for maintenance or layover. In certain embodiments, the vehicle (e.g., a locomotive) is plugged into wayside power unit 126. Wayside power unit 126 may include one or more plugs, enclosures, transformers, circuit breakers, switches, power feed connectors, and the like. Wayside power unit 126 may include a variety of control layouts and a variety of voltages (e.g., 208 volts, 220 volts, 240 volts, 480 volts, or 575 volts).

APU engine 127 of power input sources 120 is a small (e.g., 22 horsepower) diesel engine. In conventional systems, APU engine 127 provides the auxiliary power to one or more components of the vehicle. The main engine of the vehicle is started only when the vehicle is actually required for movement or traction. If the vehicle idling time is more than a predetermined time (e.g., 10 minutes), the main engine is shut down and APU engine 127 begins operation. In certain embodiments of system 100, the selection of power input sources 120 does not include APU engine 127. Using power input sources 120 other than APU engine 127 eliminates maintenance time and costs, repair time and costs, and pollutant emissions associated with APU engine 127.

Power consuming devices 130 of system 100 represent any devices that consume auxiliary power. Power consuming devices 130 receive auxiliary power from power input sources 120. Power consuming devices 130 may be located in any suitable location for receiving auxiliary power from power input sources 120. For example, power consuming devices 130 may be located on a vehicle, within the vehicle, or adjacent to the vehicle. Power consuming devices 130 may include an air compressor 131, a cab heater/air conditioner 132, a starter battery 133, electrical components 134, a water heater 135, water pump 160, an oil heater 136, and oil pump 170.

Air compressor 131 of power consuming devices 130 is a device that converts power into potential energy stored in pressurized air. Cab heater/air conditioner 132 of power consuming devices 130 includes one or more devices that provide heating and/or cooling to a cab of a vehicle. Cab heater/air conditioner 132 may be located in any suitable location to provide heat and/or air conditioning to the cab of the vehicle. For example, cab heater/air conditioner 132 may be located within the cab, mounted to a side of the vehicle, mounted to a roof of the vehicle, etc.

Starter battery 133 (i.e., starter battery 122 of power input sources 120) of power consuming devices 130 provides the power required to start the engine of the vehicle. Starter battery 122 may also be used to run the electronics in the vehicle. Electrical components 134 of power consuming devices 130 include components of the vehicle that consume electricity. Electrical components 134 may include fans, blowers, lighting (e.g., cab lighting), computers, one or more components of a positive train control (PTC) system, event recorders, fault code chips, processors, and the like. Alternator 140 is an electrical generator that converts mechanical energy to electrical energy. When the engine of system 100 is running, alternator 140 may charge the batteries and supply additional electrical power for the vehicle's electrical systems. For certain vehicles such as a locomotive, a diesel engine may drive alternator 140, which provides power to move the locomotive.

Water pump 160 of system 100 is a circulating pump that circulates water used by engine block 150 to prevent the water from freezing. Engine block 150 is part of the vehicle's main engine. Water is distributed around engine block 150 to keep the temperature of the engine within the most efficient range. Water heater 135 of power consuming devices 130 is a heating device used to heat the water used by engine block 150. Oil pump 170 is a circulating pump that circulates oil used by engine block 150 to maintain the viscosity of the oil. Oil heater 135 of power consuming devices 130 is a heating device used to heat the oil used by engine block 150.

In operation, auxiliary power controller 110 determines a first selection of one or more power input sources 120 from a plurality of power input sources 120. For example, auxiliary power controller 110 may determine that a first selection of power input sources 120 includes APU battery 121 and solar panel 125. Auxiliary power controller 110 determines a first selection of one or more power consuming devices 130 from a plurality of power consuming devices 130. For example, auxiliary power controller 110 may determine that a first selection of power consuming devices 130 includes cab heater/air conditioner 132 and starter battery 133. Auxiliary power controller 110 then manages the transfer of auxiliary power from the first selection of power input sources 121 to the first selection of power consuming devices 130. As such, system 100 of FIG. 1 may allow for flexibility in the selection of power input sources and power output consuming devices, allow for future upgrades, lower energy costs, and reduce harmful emissions.

Although FIG. 1 illustrates a particular arrangement of auxiliary power controller 110, power input sources 120, power consuming devices 130, alternator 140, engine block 150, water pump 160, and oil pump 170, this disclosure contemplates any suitable arrangement of auxiliary power controller 110, power input sources 120, power consuming devices 130, alternator 140, engine block 150, water pump 160, and oil pump 170. For example, the location of water pump 160 and oil pump 170 relative to engine block 150 may be reversed.

Although FIG. 1 illustrates a particular number of auxiliary power controllers 110, power input sources 120, power consuming devices 130, alternators 140, engine blocks 150, water pumps 160, and oil pumps 170, this disclosure contemplates any suitable number of auxiliary power controllers 110, power input sources 120, power consuming devices 130, alternators 140, engine blocks 150, water pumps 160, and oil pumps 170. For example, system 100 may include more or less than seven power input sources 120 and/or more or less than eight power consuming devices 130. As another example, system 100 may include more or less than one auxiliary power controller 110.

Modifications, additions, or omissions may be made to system 100 depicted in FIG. 1. System 100 may include more, fewer, or other components. For example, system 100 may include one or more controls, sensors, accessories, application software, and the like. One or more components of system 100 may include one or more elements from the computer system of FIG. 6.

FIG. 2 illustrates an example system 200 for managing the transfer of auxiliary power from combination APU/starter battery 123 and solar panel 125 to one more power consuming devices (e.g., cab heater/air conditioner 132, water pump 160, and/or oil pump 170) using auxiliary power controller 110. System 200 includes auxiliary power controller 110, combination APU/starter battery 123, solar panel 125, cab heater/air conditioner 132, alternator 140, engine block 150, water pump 160, and oil pump 170. As described above for FIG. 1, combination APU/starter battery 123 and solar panel 125 are input power sources of a vehicle, and cab heater/air conditioner 132, water pump 160, and oil pump 170 are power consuming devices of the vehicle.

When the engine of the vehicle associated with system 200 is running, alternator 140 of system 200 serves as a power input source to provide power to one or more power consuming devices of system 200. For example, alternator 140 may provide power to cab heater/air conditioner 132 to heat and/or cool the cab of the vehicle. As another example, alternator 140 may provide power to water pump 160 to circulate water through engine block 150 of system 200. As still another example, alternator 140 may provide power to oil pump 170 to circulate oil through engine block 150 of system 200. As yet another example, alternator 140 may provide power to combination APU/starter battery 123 to charge APU/starter battery 123.

When the engine of the vehicle associated with system 200 is shut down, alternator 140 of system 200 no longer serves as a power input source of system 200. Auxiliary power controller 110 identifies combination APU/starter battery 123 and solar panel 125 as power input sources, identifies cab heater/air conditioner 132, water pump 160, and oil pump 170 as power consuming devices, and manages the transfer of auxiliary power from combination APU/ starter battery 123 and/or solar panel 125 to cab heater/air conditioner 132, water pump 160, and oil pump 170. For example, auxiliary power controller 110 may initiate the transfer auxiliary power from APU/starter battery 123 to cab heater/air conditioner 132. If auxiliary power controller 110 determines that APU/starter battery 123 cannot meet the power demands of cab heater/air conditioner 132, auxiliary power controller 110 may initiate the transfer of auxiliary power from combination APU/starter battery 123 and solar panel 125 to cab heater/air conditioner 132. As such, system 200 may provide auxiliary power to power consuming devices without the use of an APU diesel engine, which may reduce maintenance and repair costs and harmful emissions associated with the APU diesel engine.

Although FIG. 2 illustrates a particular arrangement of auxiliary power controller 110, combination APU/starter battery 123, solar panel 125, cab heater/air conditioner 132, alternator 140, engine block 150, water pump 160, and oil pump 170, this disclosure contemplates any suitable arrangement of auxiliary power controller 110, combination APU/starter battery 123, solar panel 125, cab heater/air conditioner 132, alternator 140, engine block 150, water pump 160, and oil pump 170.

Although FIG. 1 illustrates a particular number of auxiliary power controllers 110, combination APU/starter batteries 123, solar panels 125, cab heater/air conditioners 132, alternators 140, engine blocks 150, water pumps 160, and oil pumps 170, this disclosure contemplates any suitable number of auxiliary power controllers 110, combination APU/starter batteries 123, solar panels 125, cab heater/air conditioners 132, alternators 140, engine blocks 150, water pumps 160, and oil pumps 170.

Modifications, additions, or omissions may be made to system 200 depicted in FIG. 2. System 200 may include more, fewer, or other components. For example, system 200 may include one or more controls, sensors, accessories, application software, and the like. One or more components of system 200 may include one or more elements from the computer system of FIG. 6.

FIG. 3 illustrates an example system 300 for managing the transfer of auxiliary power from APU battery 121 and solar panel 125 to one more power consuming devices (e.g., cab heater/air conditioner 132, starter battery 133, water pump 160, and/or oil pump 170) using auxiliary power controller 110. System 300 includes auxiliary power controller 110, APU battery 121, solar panel 125, cab heater/air conditioner 132, starter battery 133, alternator 140, engine block 150, water pump 160, and oil pump 170. As described above for FIG. 1, APU battery 121 and solar panel 125 are input power sources of a vehicle, and cab heater/air conditioner 132, starter battery 133, water pump 160, and oil pump 170 are power consuming devices of the vehicle.

When the engine of the vehicle associated with system 300 is running, alternator 140 of system 300 serves as a power input source to provide power to one or more power consuming devices of system 300. For example, alternator 140 may provide power to cab heater/air conditioner 132 to heat and/or cool the cab of the vehicle. As another example, alternator 140 may provide power to water pump 160 to circulate water through engine block 150 of system 300. As still another example, alternator 140 may provide power to oil pump 170 to circulate oil through engine block 150 of system 200. As yet another example, alternator 140 may provide power to APU battery 121 to charge APU battery 121. As still another example, alternator 140 may provide power to starter battery 133 to charge starter battery 133.

When the engine of the vehicle associated with system 300 is shut down, alternator 140 of system 300 no longer serves as a power input source of system 300. Auxiliary power controller 110 identifies APU battery 121 and solar panel 125 as power input sources, identifies cab heater/air conditioner 132, starter battery 133, water pump 160, and oil pump 170 as power consuming devices, and manages the transfer of auxiliary power from APU battery 121 and/or solar panel 125 to cab heater/air conditioner 132, starter battery 133, water pump 160, and oil pump 170. For example, auxiliary power controller 110 may initiate the transfer of auxiliary power from solar panel 125 to cab heater/air conditioner 132 and starter battery 133. If auxiliary power controller 110 determines that the available power supply of solar panel 125 is below a predetermined power supply level, auxiliary power controller 110 may initiate the transfer of auxiliary power from APU battery 121 and solar panel 125 to cab heater/air conditioner 132 and starter battery 133. As such, system 300 may provide auxiliary power to power consuming devices without the use of an APU diesel engine, which may reduce maintenance and repair costs and harmful emissions associated with the APU diesel engine. In certain embodiments, if APU battery 121 cannot satisfy the power demands of the power consuming devices, an Automatic Engine Start Stop (AESS) system starts the engine of the vehicle, which allows alternator 140 to satisfy the power demands of the power consuming devices.

Although FIG. 3 illustrates a particular arrangement of auxiliary power controller 110, APU battery 121, solar panel 125, cab heater/air conditioner 132, starter battery 133, alternator 140, engine block 150, water pump 160, and oil pump 170, this disclosure contemplates any suitable arrangement of auxiliary power controller 110, APU battery 121, solar panel 125, cab heater/air conditioner 132, starter battery 133, alternator 140, engine block 150, water pump 160, and oil pump 170.

Although FIG. 3 illustrates a particular number of auxiliary power controllers 110, APU batteries 121, solar panels 125, cab heater/air conditioners 132, starter batteries 133, alternators 140, engine blocks 150, water pumps 160, and oil pumps 170, this disclosure contemplates any suitable number of auxiliary power controllers 110, APU batteries 121, solar panels 125, cab heater/air conditioners 132, starter batteries 133, alternators 140, engine blocks 150, water pumps 160, and oil pumps 170.

Modifications, additions, or omissions may be made to system 300 depicted in FIG. 3. System 300 may include more, fewer, or other components. For example, system 300 may include one or more controls, sensors, accessories, application software, and the like. One or more components of system 300 may include one or more elements from the computer system of FIG. 6.

FIG. 4 shows an example solar panel system 400 that may be used by the systems of FIGS. 1 through 3. Solar panel system 400 includes solar panels 410, panel frame 420, and lift hooks 430. Solar panels 410 are components that absorb the sun's rays as a source of energy. Solar panels 410 may be any suitable size and shape. For example, each solar panel 410 may rectangular in shape, having a width of 1.75 feet and a length of 3.5 feet. Solar panels 410 may be combined to form any suitable size and shape. For example, a 3 by 4 array of solar panels may be formed to create an overall width of 5.25 feet and an overall length of 10.5 feet. Solar panels 410 may be any material suitable for absorbing the sun's rays. For example, solar panels 410 may be made of polyethylene terephthalate (PET), ethylene tetrafluoroethylene (ETFE), or any other suitable material.

In certain embodiments, solar panels 410 serve as a power input source for a vehicle. Solar panels 410 produce a predetermined number of watts of power. For example, solar panels 410 may produce 15 watts of power per square foot such that a 3 by 4 array of solar panels 410 produces 1080 watts of power. As another example, each solar panel 410 may produce 290 to 360 watts of power. Solar panels 410 may include one or more inverters that are used to convert direct current (DC) energy absorbed by the sunlight to usable alternating current (AC) energy. The AC energy may then be distributed to one or more power consuming devices of the vehicle. Solar panels 410 may be attached to the roof of a vehicle and serve as a power input source for the vehicle.

Solar panels 410 may be attached to a vehicle using panel frame 420. Panel frame 420 is any frame used to physically connect solar panels 410 to the vehicle. Panel frame 420 may be made of any suitable material that can provide structural support to solar panels 410. For example, panel frame 420 may be made of metal (e.g., steel, aluminum, nickel, titanium, copper, iron, etc.), plastic, fabric, a combination thereof, or any other suitable material. Solar panel system 400 may include one or more lift hooks 430. Lift hooks 430 may be used to lift solar panels 410 and/or panel frame 420 from the vehicle. Lift hooks 430 may be any suitable type, size, shape, and material. For example, lift hooks may be eye hooks, clevis hooks, swivel hooks, and the like. In certain embodiments, solar panels 410, panel frame 420, and lift hooks 430 of solar panel system 400 are made of materials that can withstand sun, rain, hail, wind, snow, ice, sleet, and/or other weather conditions.

FIG. 5 illustrates an example method 500 for managing the transfer of auxiliary power from one or more power input sources to the one or more power consuming devices using an auxiliary power controller. Method 500 starts at step 505. At step 510, an auxiliary power controller (e.g., auxiliary power controller 110 of FIG. 1) selects a first and second power input source from a plurality of power input sources (e.g., power input sources 120 of FIG. 1). For example, the auxiliary power controller may select one or more solar panels (e.g., solar panels 125 of FIG. 1) and a wayside power unit (e.g., wayside power unit 126 of FIG. 1) from a selection of the following power input sources: an APU battery, a starter battery, a combination APU/starter battery, a dynamic brake recapture system, solar panels, and a wayside power unit. Method 500 then moves from step 510 to step 515.

At step 515 of method 500, the auxiliary power controller selects a first and second power consuming device from a plurality of power consuming devices (e.g., power consuming devices 130 of FIG. 1). For example, the auxiliary power controller may select an air compressor (e.g., air compressor 131 of FIG. 1) and a starter battery (e.g., starter battery 133 of FIG. 1) from a selection of the following power consuming devices: an air compressor, a cab heater/air conditioner, a starter battery, electrical components, a water heater, a water pump, an oil heater, and an oil pump. Method 500 then moves from step 515 to step 520.

At step 520 of method 500, the auxiliary power controller determines the available power supply for each of the first and second power input sources. For example, the auxiliary power controller may determine that the solar panels can supply 5 kilowatts of power and the wayside power unit can supply 650 kilowatts of power. Method 500 then moves from step 520 to step 525, where the auxiliary power controller determines the required auxiliary power demand for each of the first and second power consuming devices. For example, the auxiliary power controller may determine that the air compressor requires 5 kilowatts of power and the starter battery requires 600 kilowatts of power. Method 500 then moves from step 525 to step 530.

At step 530 of method 500, the auxiliary power controller determines whether the available power supply of the first power input source meets or exceeds the required auxiliary power demand of the first and second power consuming devices. If the auxiliary power controller determines that the available power supply of the first power input source is meets or exceeds the required auxiliary power demand of the first and second power consuming devices, method 500 moves from step 530 to step 535, where the auxiliary power controller initiates the transfer of auxiliary power from the first power input source to the first and second power consuming devices.

If, at step 530, the auxiliary power controller determines that the available power supply of the first power input source is less than the required auxiliary power demand of the first and second power consuming devices, method 500 moves from step 530 to step 540, where the auxiliary power controller initiates the transfer of auxiliary power from the first and second power input sources to the first and second power consuming devices. For example, the auxiliary power controller may determine that the solar panels can only supply 5 kilowatts of power, which is less than the 605 kilowatts of auxiliary power required by the air compressor and the starter battery. To meet this power demand, the auxiliary power controller initiates the transfer of auxiliary power from the first and second power input sources to the first and second power consuming devices. Method 500 then moves from steps 535 and 540 to step 545.

At step 545 of method 500, the auxiliary power controller determines whether the power input sources and/or the power consuming devices have changed. For example, the auxiliary power controller may detect the addition of a new power input source (e.g., a dynamic brake recapture system). If the auxiliary power controller determines that the power input sources and/or the power consuming devices have changed, the auxiliary power controller modifies the selection of the power input sources and/or the power consuming devices accordingly. For example, in response to detecting the dynamic brake recapture system, the auxiliary power controller may add the dynamic brake recapture system to the selection of available power input sources. Method 500 then moves from step 550 to step 555, where method 500 ends. If, at step 545, the auxiliary power controller determines that the power input sources and/or the power consuming devices have not changed, method 500 moves from step 545 to step 555, where method 500 ends. As such, method 500 allows for flexibility in the selection of the one or more power input sources and the selection of the one or more power output consuming devices.

Modifications, additions, or omissions may be made to method 500 depicted in FIG. 5. Method 500 may include more, fewer, or other steps. For example, method 500 may include selecting more or less than two power input sources from the plurality of power input sources. Steps may be performed in parallel or in any suitable order. For example, steps 510 and 515 of method 500 may be reversed. While discussed as specific components completing the steps of method 500, any suitable component may perform any step of method 500.

FIG. 6 shows an example computer system that may be used by the systems and methods described herein. For example, one or more components (e.g., auxiliary power controller 110) of system 100 of FIG. 1 may include one or more interface(s) 610, processing circuitry 620, memory(ies) 630, and/or other suitable element(s). Interface 610 receives input, sends output, processes the input and/or output, and/or performs other suitable operation. Interface 610 may comprise hardware and/or software.

Processing circuitry 620 performs or manages the operations of the component. Processing circuitry 620 may include hardware and/or software. Examples of a processing circuitry include one or more computers, one or more microprocessors, one or more applications, etc. In certain embodiments, processing circuitry 620 executes logic (e.g., instructions) to perform actions (e.g., operations), such as generating output from input. The logic executed by processing circuitry 620 may be encoded in one or more tangible, non-transitory computer readable media (such as memory 630). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 630 (or memory unit) stores information. Memory 630 may comprise one or more non-transitory, tangible, computer-readable, and/or computer-executable storage media. Examples of memory 630 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An auxiliary power controller, comprising:
one or more processors; and
one or more computer-readable non-transitory storage media coupled to the one or more processors and comprising instructions that, when executed by the one or more processors, cause the auxiliary power controller to perform operations comprising:
determining a first selection of two or more power input sources from a plurality of power input sources;
determining a first power supply of a first power input source of two or more power input sources;
determining a second power supply of a second power input source of the two or more power input sources;
determining a first selection of one or more power consuming devices from a plurality of power consuming devices;
determining whether the first selection of two or more power input sources or the first selection of one or more power consuming devices have changed, wherein determining whether the first selection of two or more power input sources or the first selection of one or more power consuming devices have changed includes one or more of:
determining whether one or more power consuming devices of the plurality of power consuming devices have been added to the first selection of one or more power consuming devices;
determining whether one or more power consuming device have been removed from the first selection of one or more power consuming devices; and
determining whether one or more power consuming devices of the first selection of one or more power consuming devices have been replaced with one or more other power consuming devices of the plurality of power consuming devices;
modifying the selection of the two or more power input sources or the one or more power consuming devices in response to a determination that the first selection of two or more power input sources or the first selection of one or more power consuming devices have changed, wherein modifying the first selection of two or more power input sources or the first selection of one or more power consuming devices includes one or more of:
adding a power input source from the plurality of power input sources to the first selection of two or more power input sources;
removing one or more of the two or more power input sources from the first selection of two or more power input sources; and
replacing one or more of the two or more power input sources from the first selection of two or more power input sources with one or more power input sources from the plurality of power input sources; and
managing transfer of auxiliary power from the first selection of the two or more power input sources to the first selection of the one or more power consuming devices based at least on the first power supply of the first power input source and the second power supply of the second power input source.

2. The auxiliary power controller of claim 1, wherein the plurality of power input sources comprises two or more of the following:
an auxiliary power unit (APU) battery;
a starter battery;
a combination APU/starter battery;
a dynamic recapture system;
a solar panel; and
a wayside power unit.

3. The auxiliary power controller of claim 1, wherein the plurality of power consuming devices comprises two or more of the following:
a water pump;
a water heater;
an oil pump;
an oil heater;
a starter battery;
a cab heater/air conditioner;
an air compressor; and
electrical components.

4. The auxiliary power controller of claim 1, the operations further comprising:
  determining a second selection of one or more power input sources from the plurality of power input sources, wherein the second selection of the one or more power input sources is different than the first selection of the two or more power input sources;
  determining a second selection of one or more power consuming devices from the plurality of power consuming devices, wherein the second selection of the one or more power consuming devices is different than the first selection of the one or of power consuming devices; and
  managing transfer of auxiliary power from the second selection of the one or more power input sources to the second selection of the one or more power consuming devices.

5. The auxiliary power controller of claim 1, wherein managing the transfer of auxiliary power from the two or more power input sources to the one or more power consuming devices comprises:
  determining a power demand of a first power consuming device of the first selection of power consuming devices;
  determining that the first power supply of the first power input source of the first selection of the two or more power input sources exceeds the power demand; and
  initiating the transfer of the auxiliary power from the first power input source to the first power consuming device.

6. The auxiliary power controller of claim 1, wherein managing the transfer of auxiliary power from the two or more power input sources to the one or more power consuming devices comprises:
  determining a power demand of a first power consuming device of the first selection of power consuming devices;
  determining that the first power supply of the first power input source of the first selection of the two or more power input sources is less than the power demand;
  determining that the first power supply of the first power input source and the second power supply of the second power input source of the first selection of the two or more power input sources exceeds the power demand; and
  initiating the transfer of the auxiliary power from the first power input source and the second power input source to the first power consuming device.

7. The auxiliary power controller of claim 1, wherein the auxiliary power controller is located within a locomotive.

8. A method, comprising:
  determining, by an auxiliary power controller, a first selection of two or more power input sources from a plurality of power input sources;
  determining a first power supply of a first power input source of the two or more power input sources;
  determining a second power supply of a second power input source of the two or more power input sources;
  determining, by the auxiliary power controller, a first selection of one or more power consuming devices from a plurality of power consuming devices;
  determining whether the first selection of two or more power input sources or the first selection of one or more power consuming devices have changed, wherein determining whether the first selection of two or more power input sources or the first selection of one or more power consuming devices have changed includes one or more of:
    determining whether one or more power consuming devices of the plurality of power consuming devices have been added to the first selection of one or more power consuming devices;
    determining whether one or more power consuming device have been removed from the first selection of one or more power consuming devices; and
    determining whether one or more power consuming devices of the first selection of one or more power consuming devices have been replaced with one or more other power consuming devices of the plurality of power consuming devices;
  modifying the selection of the two or more power input sources or the one or more power consuming devices in response to a determination that the first selection of two or more power input sources or the first selection of one or more power consuming devices have changed, wherein modifying the first selection of two or more power input sources or the first selection of one or more power consuming devices includes one or more of:
    adding a power input source from the plurality of power input sources to the first selection of two or more power input sources;
    removing one or more of the two or more power input sources from the first selection of two or more power input sources; and
    replacing one or more of the two or more power input sources from the first selection of two or more power input sources with one or more power input sources from the plurality of power input sources; and
  managing, by the auxiliary power controller, transfer of auxiliary power from the first selection of the two or more power input sources to the first selection of the one or more power consuming devices based at least on the first power supply of the first power input source and the second power supply of the second power input source.

9. The method of claim 8, wherein the plurality of power input sources comprises two or more of the following:
  an auxiliary power unit (APU) battery;
  a starter battery;
  a combination APU/starter battery;
  a dynamic recapture system;
  a solar panel; and
  a wayside power unit.

10. The method of claim 8, wherein the plurality of power consuming devices comprises two or more of the following:
  a water pump;
  a water heater;
  an oil pump;
  an oil heater;
  a starter battery;
  a cab heater/air conditioner;
  an air compressor; and
  electrical components.

11. The method of claim 8, further comprising:
  determining, by the auxiliary power controller, a second selection of one or more power input sources from the plurality of power input sources, wherein the second selection of the one or more power input sources is different than the first selection of the two or more power input sources;
  determining, by the auxiliary power controller, a second selection one or more power consuming devices from the plurality of power consuming devices, wherein the second selection of the one or more power consuming devices is different than the first selection of the one or more of power consuming devices; and
  managing, by the auxiliary power controller, transfer of auxiliary power from the second selection of the one or more power input sources to the second selection of the one or more power consuming devices.

12. The method of claim 8, wherein managing the transfer of auxiliary power from the two or more power input sources to the one or more power consuming devices comprises:
   determining a power demand of a first power consuming device of the first selection of power consuming devices;
   determining that the first power supply of the first power input source of the first selection of the two or more power input sources exceeds the power demand; and
   initiating the transfer of the auxiliary power from the first power input source to the first power consuming device.

13. The method of claim 8, wherein managing the transfer of auxiliary power from the two or more power input sources to the one or more power consuming devices comprises:
   determining a power demand of a first power consuming device of the first selection of power consuming devices;
   determining that the first power supply of the first power input source of the first selection of the two or more power input sources is less than the power demand;
   determining that the first power supply of the first power input source and the second power supply of the second power input source of the first selection of the two or more power input sources exceeds the power demand; and
   initiating the transfer of the auxiliary power from the first power input source and the second power input source to the first power consuming device.

14. The method of claim 8, wherein the auxiliary power controller is located within a locomotive.

15. One or more computer-readable non-transitory storage media embodying instructions that, when executed by a processor, cause the processor to perform operations comprising:
   determining a first selection of two or more power input sources from a plurality of power input sources;
   determining a first power supply of a first power input source of two or more power input sources;
   determining a second power supply of a second power input source of the two or more power input sources;
   determining a first selection of one or more power consuming devices from a plurality of power consuming devices;
   determining whether the first selection of two or more power input sources or the first selection of one or more power consuming devices have changed, wherein determining whether the first selection of two or more power input sources or the first selection of one or more power consuming devices have changed includes one or more of:
      determining whether one or more power consuming devices of the plurality of power consuming devices have been added to the first selection of one or more power consuming devices;
      determining whether one or more power consuming device have been removed from the first selection of one or more power consuming devices; and
      determining whether one or more power consuming devices of the first selection of one or more power consuming devices have been replaced with one or more other power consuming devices of the plurality of power consuming devices;
   modifying the selection of the one or more power input sources or the one or more power consuming devices in response to a determination that the first selection of two or more power input sources or the first selection of one or more power consuming devices have changed, wherein modifying the first selection of two or more power input sources or the first selection of one or more power consuming devices includes one or more of:
      adding a power input source from the plurality of power input sources to the first selection of two or more power input sources;
      removing one or more of the two or more power input sources from the first selection of two or more power input sources; and
      replacing one or more of the two or more power input sources from the first selection of two or more power input sources with one or more power input sources from the plurality of power input sources; and
   managing transfer of auxiliary power from the first selection of the two or more power input sources to the first selection of the one or more power consuming devices based at least on the first power supply of the first power input source and the second power supply of the second power input source.

16. The one or more computer-readable non-transitory storage media of claim 15, wherein the plurality of power input sources comprises two or more of the following:
   an auxiliary power unit (APU) battery;
   a starter battery;
   a combination APU/starter battery;
   a dynamic recapture system;
   a solar panel; and
   a wayside power unit.

17. The one or more computer-readable non-transitory storage media of claim 15, wherein the plurality of power consuming devices comprises two or more of the following:
   a water pump;
   a water heater;
   an oil pump;
   an oil heater;
   a starter battery;
   a cab heater/air conditioner;
   an air compressor; and
   electrical components.

18. The one or more computer-readable non-transitory storage media of claim 15, the operations further comprising:
   determining a second selection of one or more power input sources from the plurality of power input sources, wherein the second selection of the one or more power input sources is different than the first selection of the two or more power input sources;
   determining a second selection of one or more power consuming devices from the plurality of power consuming devices, wherein the second selection of the one or more power consuming devices is different than the first selection of the one or more of power consuming devices; and
   managing transfer of auxiliary power from the second selection of the one or more power input sources to the second selection of the one or more power consuming devices.

19. The one or more computer-readable non-transitory storage media of claim 15, wherein managing the transfer of auxiliary power from the two or more power input sources to the one or more power consuming devices comprises:
   determining a power demand of a first power consuming device of the first selection of power consuming devices;
   determining that the first power supply of the first power input source of the first selection of the two or more power input sources exceeds the power demand; and initiating the transfer of the auxiliary power from the first power input source to the first power consuming device.

20. The one or more computer-readable non-transitory storage media of claim 15, wherein managing the transfer of auxiliary power from the two or more power input sources to the one or more power consuming devices comprises:
- determining a power demand of a first power consuming device of the first selection of power consuming devices;
- determining that the first power supply of the first power input source of the first selection of the two or more power input sources is less than the power demand;
- determining that the first power supply of the first power input source and the second power supply of the second power input source of the first selection of the two or more power input sources exceeds the power demand; and
- initiating the transfer of the auxiliary power from the first power input source and the second power input source to the first power consuming device.

* * * * *